United States Patent

Hutchison, IV et al.

(10) Patent No.: US 6,839,570 B2
(45) Date of Patent: Jan. 4, 2005

(54) METHOD AND CIRCUIT FOR INTERFACING A MODEM IN A WIRELESS COMMUNICATION DEVICE TO A SUBSCRIBER INTERFACE MODULE

(75) Inventors: James A. Hutchison, IV, San Diego, CA (US); Steven I. Sutankayo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 422 days.

(21) Appl. No.: 09/773,768

(22) Filed: Feb. 2, 2001

(65) Prior Publication Data

US 2001/0034246 A1 Oct. 25, 2001

Related U.S. Application Data

(60) Provisional application No. 60/180,228, filed on Feb. 4, 2000.

(51) Int. Cl.$^7$ .............................................. H04M 1/00
(52) U.S. Cl. .................... 455/558; 455/557; 455/550.1; 379/93.06
(58) Field of Search .............................. 455/550.1, 558, 455/559, 556.1, 557, 572, 90.3, 90.2, 90.1, 575.3, 575.1; 379/93.06, 93.05; 375/222

(56) References Cited

U.S. PATENT DOCUMENTS 5,327,018 A 7/1994 Karlisch et al.
5,487,084 A * 1/1996 Lindholm .................... 375/215
5,920,850 A * 7/1999 Hunter et al. ................ 705/405
6,341,069 B1 * 1/2002 Torlotin ....................... 361/737
6,584,326 B1 * 6/2003 Boydston et al. ........... 455/558

FOREIGN PATENT DOCUMENTS

| EP | 0525963 | 6/1992 |
|---|---|---|
| EP | 0896490 | 2/1999 |
| WO | 9712478 | 4/1997 |

OTHER PUBLICATIONS

International Search Report, mailed Oct. 22, 2001.

* cited by examiner

*Primary Examiner*—Nay Maung
*Assistant Examiner*—Tanmay Lele
(74) *Attorney, Agent, or Firm*—Philip Wadsworth; Charles D. Brown; Howard H. Seo

(57) ABSTRACT

A circuit for interfacing a modem in a wireless communication device to a Subscriber Interface Module (SIM) includes a modem controller, a Universal Asynchronous Receiver/Transmitter (UART) connected to the modem controller, a programmable clock circuit adapted to generate a SIM clock and a UART clock independently of one another based on a common clock and a control signal provided to the programmable clock circuit, a reset circuit to generate a SIM reset signal, and a power control circuit to control powering on and off the SIM, all on an integrated circuit chip. The circuit also includes a Bus Interface circuit to interface the modem to the SIM using a common data line.

17 Claims, 7 Drawing Sheets

METHOD AND CIRCUIT FOR INTERFACING A MODEM IN A WIRELESS COMMUNICATION DEVICE TO A SUBSCRIBER INTERFACE MODULE

CROSS-REFERENCE TO RELATED APPLICATIONS

The present application claims priority to the Provisional application entitled "Circuit and Method for Interfacing Modem with Subscriber Identity Module," Application No. 60/180,228, Steven Sutankayo et al., filed on Feb. 4, 2000, incorporated herein in its entirety by reference.

BACKGROUND OF THE INVENTION

1. Field of the Invention

The present invention relates generally to wireless communication devices, and more particularly, to such a wireless communication device including a Subscriber Identity Module.

2. Background Art

A Subscriber Identity Module (SIM) is a smart card, or the like, used in connection with a Wireless Communication Device (WCD), such as a cellular radiotelephone, for example. A conventional SIM includes a small computer system having a controller and a memory. The SIM memory contains information related to a subscriber/user of the WCD, including, for example, a subscriber/user identifier, a phonebook identifying a stored bank of telephone numbers, messages, encryption sequences for secured data communications over the air, and so on. Typically, a subscriber can install the SIM in or remove the SIM from the WCD. The SIM can be removed from a first WCD and installed in a second WCD, thereby allowing the user the flexibility of being able to essentially transport his or her "identity" between WCDs.

A conventional SIM includes a relatively simple electrical interface, including a SIM I/O port for transmitting serialized data to and receiving serialized data from another device (such as a WCD), a SIM clock input for receiving a clock, and reset input for receiving a reset signal. However, functionally interfacing with the conventional SIM (for example, interacting with and accessing data from the SIM) can be complicated because the SIM has a processor, and because there are various existing standards (such as the Global System for Mobile Communications (GSM) standards) generally requiring a relatively elaborate scheme for communicating with a SIM. Therefore, functionally interfacing with the SIM through a functional SIM interface is more complicated than just reading data from a memory, for example. Instead, the SIM and a requesting device connected thereto (for example, the WCD) actually exchange commands and responses in a back-and-forth fashion. Further complicating matters is the fact that some SIMs do not comply with generally accepted SIM interface standards (such as GSM).

Therefore, there is a need to provide an interface for interfacing a WCD to a SIM both electrically and functionally, whereby the WCD can control and access the information contained in the SIM. There is a related need to provide such an interface enabling a WCD to interface with a SIM that complies with generally accepted SIM interface standards, and a SIM that does not comply with such standards.

There is an ever increasing need to reduce power consumption in, and a part count, size, and cost of a WCD. Therefore, it is desirable to reduce all of these aspects in a WCD including an interface for interfacing the WCD to a SIM.

BRIEF SUMMARY OF THE INVENTION

Summary

The present invention provides a method and circuit for interfacing a modem in a WCD to a SIM. The SIM includes an Input/Output (I/O) port for transmitting and receiving serial data, a clock input for receiving a SIM clock, and a reset input for receiving a reset signal. In one embodiment, the present invention comprises a circuit for interfacing the modem to the SIM. The circuit comprises a modem controller and a Universal Asynchronous Receiver/Transmitter (UART) connected to the modem controller. The UART includes a transmitter and a receiver to respectively transmit data to and receive data from the SIM I/O port over a common data line. The circuit also includes a programmable clock circuit adapted to generate the SIM clock and the UART clock based on a common clock provided to the programmable clock circuit. The programmable clock circuit is adapted to generate the SIM clock and the UART clock independently of one another in response to a clock control signal from the modem controller.

According to an aspect of the present invention, the modem controller, the UART, and the programmable clock circuit are each constructed on the same integrated circuit (IC) chip.

According to another aspect of the present invention, the programmable clock circuit is adapted to selectively enable and disable the SIM clock independently of the UART clock in response to a SIM clock enable/disable control signal.

According to yet another aspect of the present invention, the modem controller is adapted to configure the UART to operate in a byte mode wherein the UART receiver collects serialized data bytes from the UART transmitter or the SIM I/O port when transmitted at a programmable baud rate.

According to another aspect of the present invention, the modem controller is adapted to configure the UART to operate in a sample mode wherein the UART receiver repetitively samples a signal state of the common data line at a sample rate that is a multiple of the programmable baud rate so as to collect sample data bytes. The modem controller is further adapted to read the sample data bytes and to detect error conditions related to the SIM based on the sample data bytes collected by the UART receiver.

According to yet another aspect of the present invention, the circuit includes a reset circuit adapted to derive and selectively assert and de-assert the SIM reset signal in response to a SIM reset control signal from the modem controller.

The SIM I/O port is configured as an open-drain I/O port and the common data line is connected between the SIM I/O port and the UART receiver. According to another aspect of the present invention, the circuit further comprises a Bus I/F circuit having an input coupled to the UART transmitter and an output coupled to the common data line. The Bus I/F circuit is adapted to present a high-impedance to the common data line when the transmitter applies a first logic level to the input of the open drain interface circuit, and a low impedance to signals on the common data line when the transmitter applies a second logic level to the input of the open drain interface circuit.

According to yet another aspect of the present invention, the circuit comprises a first power switch connected between a power supply rail of the WCD used to supply power to the Bus I/F circuit and a power input of the Bus I/F circuit. The first power switch is adapted to selectively connect and disconnect the WCD power supply rail to the power input of the Bus I/F circuit in response to a first switch control signal. The circuit also comprises a first switch control circuit adapted to derive the first switch control signal in response to a first control signal from the modem controller, whereby the modem controller can selectively apply power to and remove power from the SIM.

According to yet another aspect of the present invention, the circuit comprises a second power switch connected between a power supply rail of the WCD used to supply power to the SIM and a power input of the SIM. The second power switch is adapted to selectively connect and disconnect the WCD power supply rail to the SIM power input in response to a second switch control signal. The circuit further comprises a second switch control circuit adapted to derive the second switch control signal in response to a second control signal from the modem controller, whereby the modem controller can selectively apply power to and remove power from the SIM.

According to an even further aspect of the present invention, the circuit comprises an interval timer adapted to generate an interrupt to the modem controller after a programmable delay time based on a clock received by the interval timer and in accordance with a delay control signal from the modem controller.

In another embodiment, the present invention comprises a method of interfacing the modem to the SIM. The method comprises configuring the UART to operate in the sample mode and transmitting a byte to the SIM over the common line using the UART transmitter. The method further comprises repetitively sampling a state of the common line during an error signal window occurring after the byte has been transmitted, thereby collecting sample bytes indicative of whether an error related to the SIM has occurred. The method further comprises determining whether the error related to the SIM has occurred based on the sample bytes, and retransmitting the byte to the SIM when it is determined that the error related to the SIM has occurred.

Features and Advantages

The present invention provides an interface, including a method and circuit, for interfacing a WCD to a SIM both electrically and functionally, whereby the WCD can control and access information contained in the SIM. The interface is sufficiently flexible as to enable the WCD to interface with a SIM that complies with generally accepted SIM interface standards, and a SIM that does not comply with such standards.

The interface includes a plurality of interface circuits constructed on a single integrated circuit chip, thereby reducing part count, size, and power requirements in the WCD.

The interface re-uses circuits and capabilities of a modem of the WCD, including a modem controller, instead of adding a dedicated controller to implement and control the interface, thereby further reducing the part count of and conserving power in the WCD.

For example, the interface provides data connectivity between the modem and the SIM through a modem UART. The interface derives and controls a UART clock and a SIM clock independently of one another. Also, the interface derives and controls a SIM reset signal independently of the SIM and UART clocks. As a result, the interface has the flexibility to initialize and/or reset the logic in the SIM, detect error conditions transmitted by the SIM, detect when the SIM has been installed in and removed from the WCD, and so on.

The interface includes a Bus interface circuit connected between the modem and the SIM, thereby enabling the modem and the SIM to share a common data line used for communicating data between the two devices. The interface can repetitively sample the common data line in a sample mode to detect error conditions associated with the SIM. Alternatively the interface can sample the common data line in a byte mode, thereby collecting data bytes or characters communicated on the common data line.

The interface can selectively apply power to and remove power from the Bus interface circuit, thereby conserving power in the WCD and protecting the SIM and modem when the SIM is not in use.

The interface can selectively apply power to and remove power from the SIM, thereby further conserving power in the WCD.

BRIEF DESCRIPTION OF THE DRAWINGS/FIGURES

The foregoing and other features and advantages of the invention will be apparent from the following, more particular description of a preferred embodiment of the invention, as illustrated in the accompanying drawings.

DETAILED DESCRIPTION OF THE INVENTION

Environment

Figure 1:
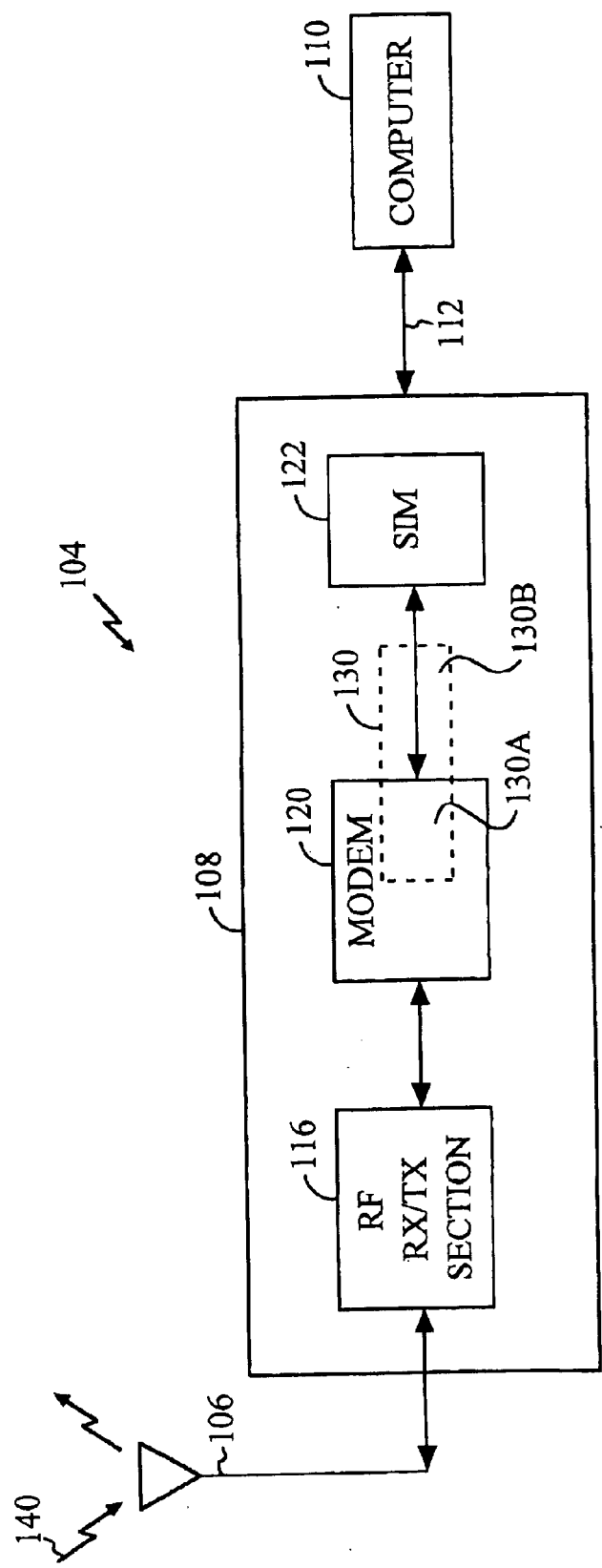
FIG. 1 is a block diagram of an example WCD in which the present invention can be implemented.

FIG. 1 is a block diagram of an example WCD 104 in which the present invention can be implemented. Non-limiting examples of WCD 104 include a cellular radiotelephone, a satellite radiotelephone, a PCMCIA card incorporated within a computer, and so on. WCD 104 includes a transmit/receive antenna 106 and a signal processing module 108 coupled to antenna 106. WCD 104 can be coupled to a computer 110 by a datalink 112.

Signal processing module 108 includes a Radio Frequency (RF) receive (Rx) and transmit (Tx) section 116, a modem 120, and a conventional SIM 122 adapted to be installed in (for example, plugged into) and removed (for example, un-plugged) from signal processing module 108. Modem 120 includes a demodulator/decoder section and an encoder/modulator section, both coupled to RF Rx/Tx section 116. Modem 120 also includes a modem controller for controlling the modem and SIM 122, as will be described in detail below. Conventional SIM 122 includes a small computer system having a controller and a memory. The SIM memory contains information related to a subscriber/user of WCD 104, including, for example, a subscriber/user identifier, a phonebook identifying a stored bank of telephone numbers, messages, encryption sequences for secured data communications over the air, and so on. The present invention can be used with a SIM compliant with the following standards: ISO/IEC 7816, TIA/EIA IS-820, GSM 11.11, and GSM 11.12. However, the present invention is not limited to use with such a SIM, and can thus be used with a SIM that does not strictly comply with such standards.

Signal processing module 108 also includes a SIM Interface (I/F) 130 (depicted in dotted line in FIG. 1), constructed and operated in accordance with the principles of the present invention, for interfacing modem 120 to SIM 122. SIM I/F 130 includes an internal SIM I/F 130a within or internal to modem 120. SIM I/F 130 also includes an external SIM I/F 130b external to modem 120. Modem 120 can control and access the information contained in SIM 122 through SIM I/F 130, in a manner to be described in detail below.

A brief overview of the operation of WCD 104 is now provided for completeness. In a receive direction, antenna 106 of WCD 104 receives an RF signal 140 transmitted from another wireless communication device (not shown), such as a base station, mobile device, and so on. RF signal 140 can comply with any number of communication protocols including, for example, a Code Division Multiple Access (CDMA) communication protocol. In addition, RF signal 140 can carry information formatted in accordance with a data protocol, such as TCP/IP (Transaction Control Protocol/Internet Protocol).

Antenna 106 provides RF signal 140 to RF Rx/Tx section 116. RF section 116 frequency down-converts the received RF signal, and provides a frequency down-converted signal, such as an Intermediate Frequency (IF) or a baseband signal, to the demodulator/decoder section of modem 120. The demodulator/decoder section demodulates and then decodes the down-converted signal to produce a demodulated and decoded signal, available for use in WCD 104 or computer 110, for example.

In a transmit direction, the modulator/encoder section of modem 120 encodes and modulates data to be wirelessly transmitted to a remote device, and provides an encoded and modulated baseband or IF signal to RF Rx/Tx section 116. RF Rx/Tx section 116 frequency up-converts the baseband or IF signal to produce an RF transmit signal. RF Rx/Tx section 116 provides the RF transmit signal to antenna 106, to be wirelessly transmitted by the antenna.

External SIM I/F (130b)

Figure 2A:
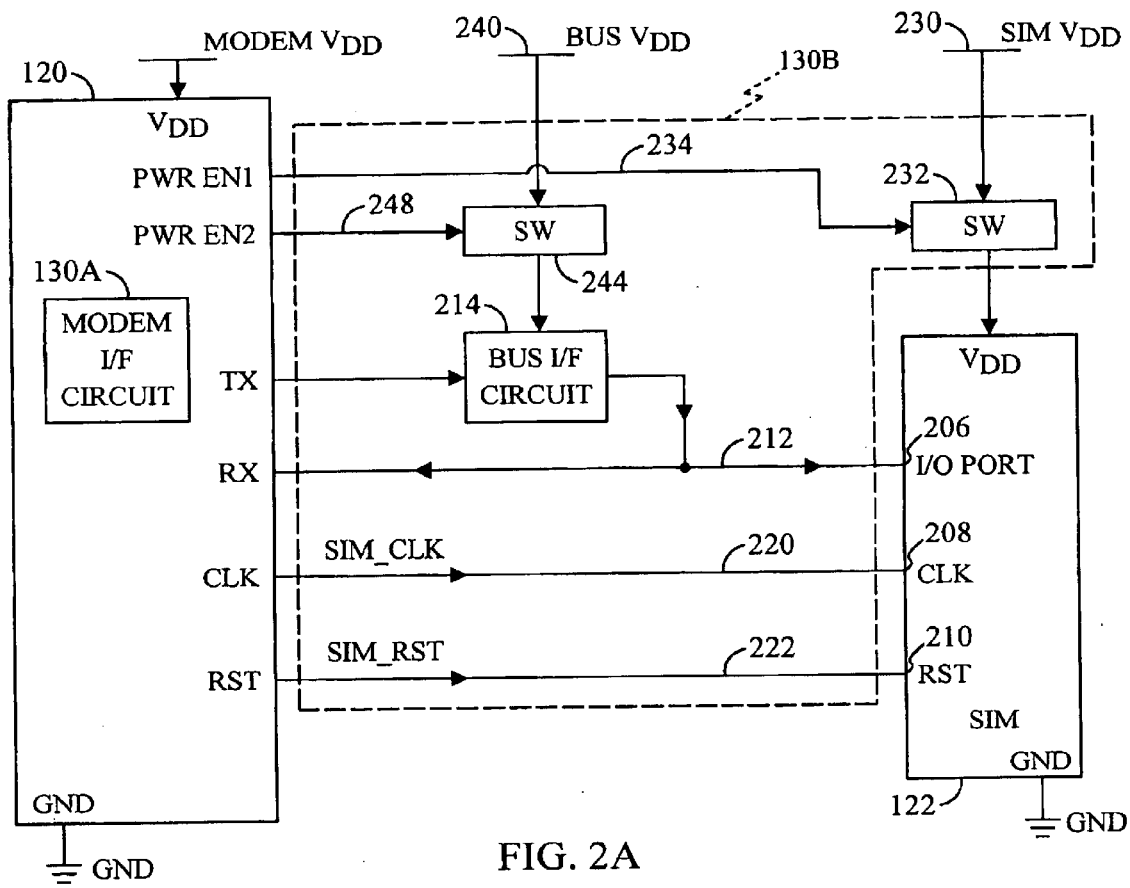
FIG. 2A is a block diagram of an external portion of a SIM Interface of FIG. 1, according to an embodiment of the present invention.

FIG. 2A is a block diagram of external SIM I/F 130b, according to an embodiment of the present invention. In FIG. 2A, external SIM I/F 130b is depicted in relation to both modem 120 and conventional SIM 122. Conventional SIM 122 includes a SIM Input/Output (I/O) port 206 to transmit serial data bits to and receive serial data bits from modem 120, a SIM clock input 208, and a SIM reset input 210.

SIM I/O port 206 can transmit a data signal, including serial data bits, to a receive port (labeled "RX") of modem 120 over a common data line 212 connected between the SIM I/O port and the modem RX port. Modem 120 includes a transmit port (labeled "TX") to transmit a data signal, including serial data bits, to SIM I/O port 206. The modem TX port transmits the data signal to I/O port 206 through a Bus I/F circuit 214 having an input connected to the modem TX port and an output connected to common data line 212. The modem TX port first transmits the data signal to the Bus I/F circuit input, and in response, the Bus I/F circuit output transmits the data signal to SIM I/O 206 over common data line 212. Therefore, modem 120 transmits serial data to and receives serial data from SIM I/O port 206 over common data line 212. In the present invention, modem 120 and SIM I/O port 206 can safely share common data line 212 because of Bus I/F circuit 214, as will be described in further detail below.

Modem 120 derives a SIM clock ("SIM_CLK") at a modem output labeled "CLK" in FIG. 2A, and transmits the SIM clock to SIM input 208 over a clock line 220. The SIM clock drives logic within SIM 122. Modem 120 can selectively enable and disable the SIM clock to control SIM 122.

Modem 120 derives a SIM reset signal ("SIM_RST") at a modem output labeled "RST" in FIG. 2A, and transmits the SIM reset signal to SIM reset input 210 over a reset line 222. The SIM reset signal can be used to reset SIM 122. Modem 120 can selectively assert and de-assert the SIM reset signal to control SIM 122.

A first power supply rail 230 (labeled "SIM $V_{DD}$") external to modem 120 supplies power to a power supply input of SIM 122 through a SIM power switch 232. Power switch 232 can selectively apply power to and remove the power from SIM 122 in response to a SIM power control signal provided to switch 232 over a line 234. Modem 120 derives the SIM power control signal at a first power enable output of modem 120 (labeled "PWR EN1"), whereby the modem can selectively power-on and power-off SIM 122 to conserve power when SIM 122 is not in use. An exemplary switching circuit for power switch 232 includes a FET transistor having a source-drain current path connected between power supply rail 230 and the power supply input of SIM 122, and a gate electrode connected to line 234.

A second external power supply rail 240 (labeled "Bus $V_{DD}$") supplies power to a power supply input of Bus I/F circuit 214 through a Bus power switch 244. Power supply rails 230 and 240 can be the same or different power supply rails. Power switch 244 can apply power to and remove the power from Bus I/F circuit 214 in response to a Bus power control signal provided to switch 244 over a line 248. Modem 120 derives the Bus power control signal at a second power enable output of modem 120 (labeled "PWR EN2"), whereby the modem can selectively power-on and power-off Bus I/F circuit 214 to further conserve power and protect SIM and modem circuits in the present invention. Power switch 244 can include a switching circuit similar to that of switch 234, described above.

As described above, external SIM I/F 130b includes power switches 232 and 244, Bus I/F circuit 214, and the various signal lines 234, 248, 212, 220, and 222, and so on, necessary for conveying the above mentioned interface signals (for example, SIM_CLK, SIM_RST, data signals, and power control signals) between modem 120 and SIM 122.

Bus I/F Circuit

As described above, modem 120 and SIM 122 share common line 212. SIM I/O port 206 is configured as an open-drain output. Such open-drain outputs are known in the art. Therefore, common line 212, attached to SIM I/O port 206, is referred to herein as an open-drain bus. Bus I/F circuit 214 provides a mechanism by which either modem 120 or SIM 122 can drive common line 212 (the open-drain bus) to a desired voltage level without damaging the other device sharing the common line, as is now described.

In the present invention, the modem transmit and receive ports TX and RX each have a dedicated function. The modem transmit port TX includes a drive circuit to actively drive a line attached thereto to either a high or low voltage level (corresponding to a logic high "1" or a logic low "0" binary value, for example). The modem receive port RX can sense (that is, sample) a voltage level on common line 212 and translate the level to either a logic high "1" or a logic low "0" binary value. In general, the RX port cannot sense the level (that is, state) of the TX port unless a physical connection exists between the RX arid TX ports.

Because the TX port drive circuit actively drives the line attached thereto, another device attached to and driving the same line in a manner conflicting with the TX port may cause damage to the TX port drive circuit and/or result in unnecessary current draw. For example, connecting SIM I/O port 206 directly to the modem TX port could result in a condition where the modem TX port IS driving a high logic level while SIM I/O port 206 is driving a low logic level by, for example, providing a low resistance path to ground. Since a potential difference exists across such a low resistance path to ground, SIM I/O port 206 may sink a high current from the modem TX port under the aforementioned condition. As a result, damage to either modem 106 or SIM 122 may occur.

To safely interface both the modem TX and RX ports to SIM I/O port 206, Bus I/F 214 adapts the modem TX port to an open-drain bus configuration compatible with SIM I/O port 206. Bus I/F 214 operates as follows:

1) when the modem TX port is driving a logic high at the input to Bus I/F circuit 214, the output of the Bus I/F circuit presents a high-impedance to common line 212, whereby an external device connected to the common line can either "pull-up" the voltage on common line 212 to a logic high level, or "pull-down" the voltage to a logic low level; and 2) when the modem TX port is driving a logic low at the input to Bus I/F circuit 214, the output of Bus I/F circuit 214 presents a low-impedance path to ground to signals on common line 212 (for example, to SIM I/O port 206), whereby the voltage on common line 212 is driven to a logic low level.

Figure 2B:
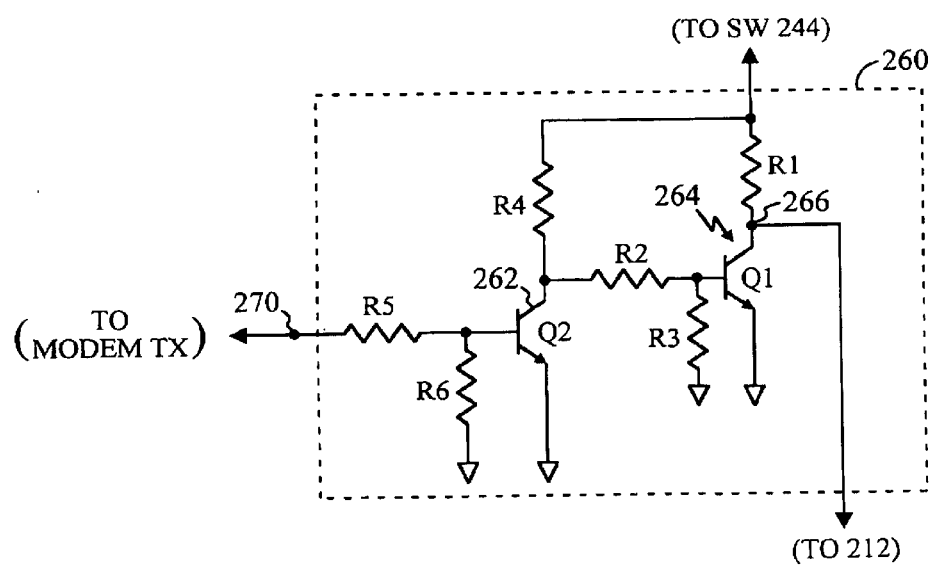
FIG. 2B is a circuit diagram of an example Bus Interface circuit of FIG. 2A, according to the present invention.

FIG. 2B is a circuit diagram of an example Bus I/F circuit 260 corresponding to Bus I/F circuit 214. In FIG. 2B, a reference label "Rx" (such as "R4") denotes a resistor and a reference label "Qx" (such as "Q1") denotes a transistor. Bus I/F circuit 260 includes a first NPN transistor 262 (Q2) and a second NPN transistor 264 (Q4) connected in series with the first NPN transistor. Each of the transistors 262 and 264 is configured as an open-collector inverter. As described above, an output terminal 266 of Bus I/F circuit 260 (connected to common line 212) presents either a high-impedance or a low-impedance path to ground to signals on the common line, in response to a high or low voltage level, respectively, at an input terminal 270 of the Bus I/F circuit (connected to the modem TX port).

For simplicity, the two inverter stages corresponding to transistors 262 and 264 are depicted as being identical in FIG. 2A. However, the inverter stages need not be identical. For example, the first inverter stage can be a logic inverter implemented in any type of logic, such as TTL or CMOS, for example. Also, the second inverter stage can be an N-channel enhancement MOS-FET. In addition, the use of two inverter stages is not necessary. Any circuit meeting the input/output requirements described above can be used.

Internal Circuit

Figure 3:
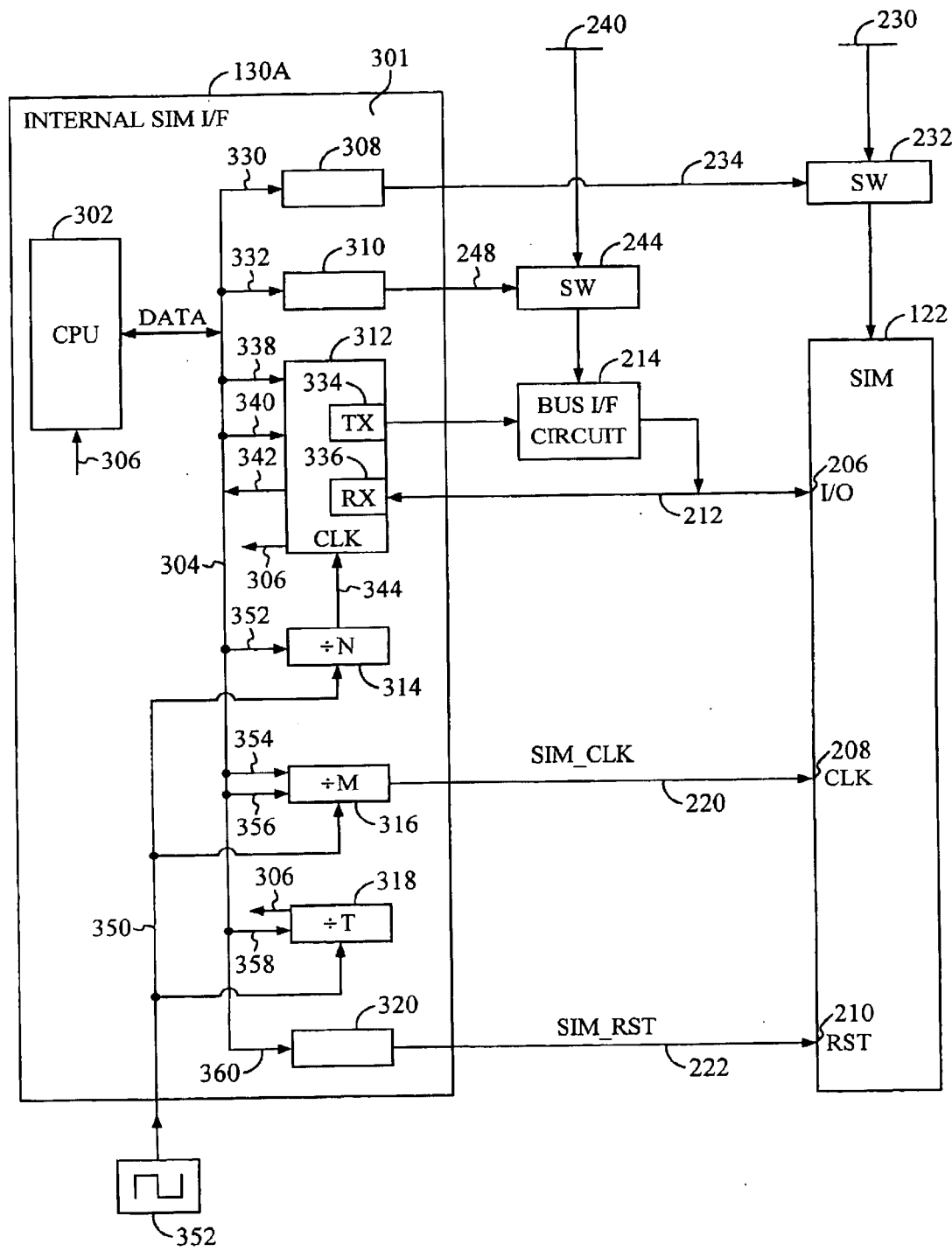
FIG. 3 is a block diagram of an internal portion of a SIM Interface of FIG. 1, according to an embodiment of the present invention.
Figure 4A:
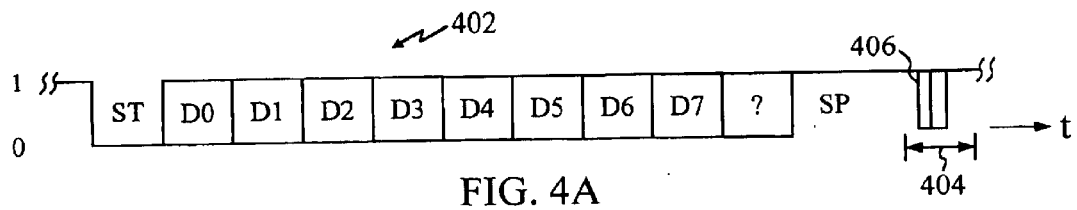
FIG. 4 is a series of example timing diagrams (a) through (g) corresponding to signals or clocks of a SIM Interface of FIG. 1.
Figure 4B:
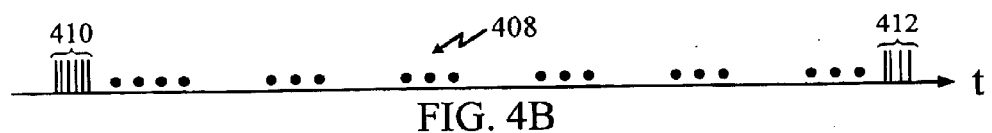
Figure 4C:
Figure 4D:
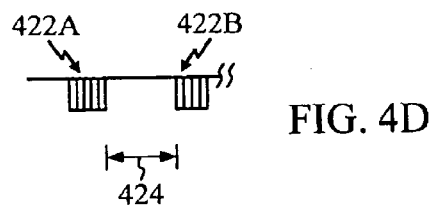
Figure 4E:
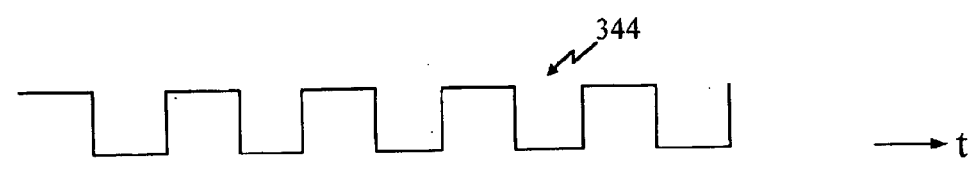
Figure 4F:
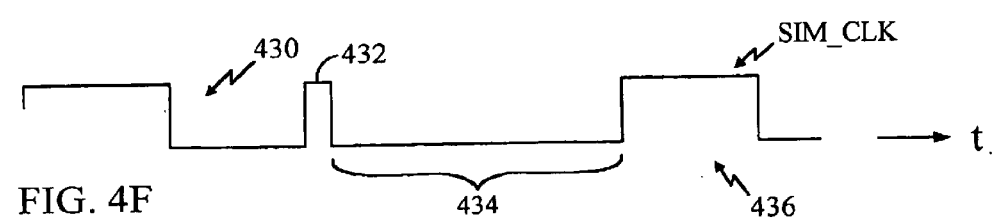
Figure 4G:
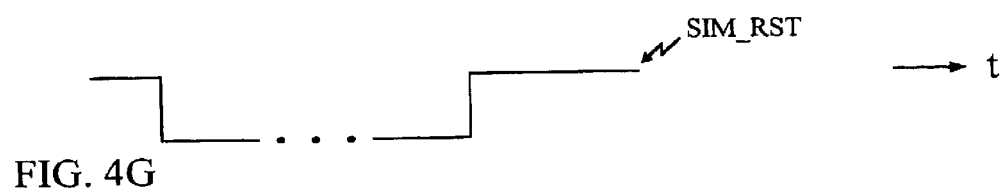

FIG. 3 is a block diagram of internal SIM I/F 130a (depicted in conjunction with external SIM I/F 130b, described above) according to an embodiment of the present invention. In a preferred embodiment, a plurality of circuits associated with internal SIM I/F 130a are constructed on a single integrated circuit chip 301 within modem 120 (as will be described below), thereby advantageously reducing the size of and part count in WCD 104.

Modem Controller

Internal SIM I/F 130a includes a modem controller 302 (also referred to as a Central Processing Unit (CPU)) coupled to a data bus 304. Associated with data bus 304 are an address bus and data read and write signals (not shown), as would be apparent to one of ordinary skill in the art. Modem controller 302 is preferably a 32-bit controller (such as a 32-bit Reduced Instruction Set Controller), and correspondingly, data bus 304 is preferably a 32-bit bus.

Modem controller 302 can write data and/or commands (also referred to as control signals) to other circuit components (described below) coupled to data bus 304. Modem controller 302 can also read data from the other circuit components, as and when appropriate. Modem controller 302 can access (for example, write to and/or read from) the various other components coupled to data bus 304 using a memory mapped access technique, an I/O port access technique, or any other access techniques, as would be apparent to one of ordinary skill in the art.

Modem controller 302 can receive one or more interrupt signals 306 each associated with a different interrupt condition from the various circuit components coupled to data bus 304, as will be further described below. The particular mechanisms associated with receiving an interrupt are well known in the art, and thus will not be described further.

Modem controller 302 controls circuits and functions in modem 104 not directly associated with interfacing modem 104 to SIM 122, such as demodulating/decoding, encoding/modulating, and transferring data within modem 104 and between the modem and external devices, such as computer 110. The present invention reuses modem controller 302 as a SIM interface controller. This beneficially avoids adding a separate controller dedicated to controlling the SIM interface, thereby reducing power consumption, cost and part count in WCD 104, while advantageously maintaining a flexible and powerful SIM interface.

Internal SIM I/F 130a further includes a SIM power control circuit 308, a Bus power control circuit 310, a UART 312, a UART clock circuit 314, a SIM clock circuit 316, an interval timer 318, and a SIM reset circuit 320, each coupled to data bus 304.

Power Control

SIM power control circuit 308 derives the SIM power control signal (mentioned above in connection with FIG. 2A) in response to a SIM power control signal 330 (also referred to as a command 330) received from modem controller 302, whereby modem controller 302 can power-on and power-off SIM 122.

Similarly, Bus power control circuit 310 derives the Bus power control signal (also mentioned above in connection with FIG. 2A) in response to a Bus power control signal 332 received from modem controller 302, whereby modem controller 302 can power-on and power-off Bus I/F circuit 214. Control circuits 308 and 310 can be latched to latch data values ("0" or "1") provided thereto over data bus 304.

In alternative embodiments, one or both of power switches 232 and 244, and their associated control circuits 308 and 310, are eliminated. For example, in one alternative embodiment, switch 232 and power rail 230 depicted in FIG. 2A can be omitted. In such an embodiment, switch 244 selectively applies power to both Bus I/F circuit 214 and SIM 122. By omitting switch 232, this embodiment advantageously reduces the number of parts in WCD 104.

Also, one or more of Bus I/F circuit 214, and switches 244 and 232, can be constructed on integrated circuit 301, to thus form part of internal I/F 130a instead of external circuit 130b.

Universal Asynchronous Receiver/Transmitter (UART)

UART 312 includes a UART transmitter 334 (corresponding to the TX port of modem 120) and a UART receiver 336 (corresponding to the RX port of modem 120). Modem controller 302 sends UART control signals 338 to UART 312 to configure and control the UART receiver and transmitter 334 and 336. For example, modem controller 302 configures a baud rate, number of bits in a character frame (or byte), number of stop bits, and parity (even or odd) used by UART 312. UART 312 provides one or more of the interrupt signals 306 to modem controller 302 depending on a state of the UART transmitter 334 and/or receiver 336.

In a transmit direction with respect to modem 120, modem controller 302 can write one or more data bytes 340 to be transmitted to SIM I/O 206, to UART transmitter 334. In response, UART transmitter 334 transmits the data bytes in the form of serial data bits to SIM I/O 206 through Bus I/F circuit 214, as mentioned above.

In a receive direction, UART receiver 336 can repetitively sample a signal state (that is, a logic level) of common line 212 to collect sample bytes corresponding to the signal state of the common line. Then, modem controller 302 can read the sample bytes (labeled as sample bytes 342 in FIG. 3) collected by UART receiver 336, from the UART receiver. UART 312 provides an interrupt signal (306) to modem controller 302 indicating the UART has received (and collected sample bytes corresponding to) a data byte transmitted by SIM I/O port 206 or UART transmitter 334, in a manner to be further described below.

UART 312 receives a UART clock 344 derived or generated by UART clock circuit 314 (described below). UART 312 can transmit and receive serial data at different baud rates determined by UART clock 344 and in accordance with a baud rate control signal (338) received from modem controller 302.

UART receiver 336 can operate in either of two modes, including a byte mode and a sample mode, according to a mode control command (338) received from modem controller 302. When commanded to the byte mode, UART receiver 336 receives and collects serialized data bytes transmitted by SIM I/O port 206. To do this, UART receiver 336 samples received serial data bits at a sample rate commensurate with a baud rate at which SIM I/O port 206 (or UART transmitter 334) transmits the serial data bits over common data line 212. Typically, the UART samples each received serial data bit only once or twice in the byte mode. Such operation is conventional.

However, when commanded to the sample mode, UART receiver 336 repetitively samples common data line 212 at a sample rate many times greater than the baud rate at which SIM I/O port 206 transmits the serial data bits. For example, UART receiver 336 may sample common line 212 at a rate 16× a current baud rate, whereby the UART receiver samples the common line sixteen times during a single serial bit time (of a serial bit transmitted by SIM I/O port 206 or UART transmitter 334). In this example, UART receiver 336 collects sixteen sample bytes per each serial bit transmitted by SIM I/O port 206.

UART receiver 336 can sample common line 212 in either the sample or byte mode while SIM I/O port 206 or UART transmitter 334 transmits data to common line 212. Therefore, UART receiver 336 can operate in a wrap-around fashion, whereby the receiver samples and collects data transmitted by UART transmitter 334. Also, UART receiver 336 can sample common line 212 when neither SIM I/O port 206 nor UART transmitter 334 transmits data on common line 212.

Clocks and Timing

Internal SIM I/F 130a receives a common clock 350 from an external clock source 352, such as a crystal oscillator. Exemplary frequencies of common clock 350 include 19.2, 19.68, and 19.8 MHz. Programmable UART clock circuit 314, programmable SIM clock circuit 316, and programmable interval timer 318 each receive common clock 350 at respective inputs thereof.

UART clock circuit 314 derives UART clock 344 based on common clock 350 and in accordance with a UART clock control signal 352 received from modem controller 302. UART clock circuit 314 can be a programmable divider to divide the frequency of common clock 350 by a value N according to the UART clock control signal 352, thereby producing UART clock 344 at a controlled frequency.

Similarly, SIM clock circuit 316 derives the SIM clock signal based on common clock 350 and in accordance with a first SIM clock (frequency) control signal 354 received from modem controller 302. SIM clock circuit 316 can be a programmable divider to divide the frequency of common clock 350 by a value M according to the SIM clock control signal 354, thereby producing the SIM clock at a controlled frequency. In addition, SIM clock circuit 314 can selectively enable and disable the SIM clock in response to a second SIM clock control (enable/disable) signal 356 received from modem controller 302. SIM clock circuit 316 applies a static logic low ("0") or logic high ("1") to reset line 220 in response to receiving a SIM clock disable signal from modem controller 302.

Interval timer 318 derives a programmable delay time based on common clock 350 and in accordance with a timer control signal 358 received from modem controller 302. Interval timer 318 can include a programmable divider and/or counter to count clock cycles of common clock 350. In operation, modem controller 302 programs interval timer 318 with a delay time. After the delay time has elapsed, interval timer 318 provides a timeout interrupt (306) to modem controller 302, whereby modem controller 302 can keep track of timing associated with controlling SIM 122.

Reset

SIM reset control circuit 320 derives the SIM reset signal in response to a SIM reset control signal 360 received from modem controller 302, whereby modem controller 302 can reset SIM 122. SIM reset control circuit 320 can be a latch to latch a data value ("0" or "1") provided thereto.

Signal and Clock Timing Diagrams

FIG. 4 is a series of example timing diagrams (a) through (g) of signals associated with the interface circuit of the present invention. Timing diagram (a) represents an example serialized data byte 402 applied to common data line 212 by either SIM I/O port 206 or modem transmitter 334. Serialized data byte 402 includes a time-ordered sequence of serial logic bits (each associated with a logic "1" or a logic "0" value or state). Serialized data byte 402 includes a start bit "ST" (logic "0"), eight data bits D0 through D7, a parity bit "P," and one or more stop bits "SP" (logic "1"). The format of serialized data byte 402 depicted in timing diagram (a) is exemplary only. Other formats, including different numbers of stop bits, for example, are possible.

When SIM 122 has transmitted a serialized data byte (for example, data byte 402) to or received the same from modem 120, the SIM can indicate an error condition during a period of time 404 referred to as a SIM error window 404, following the stop bit(s) of the serialized data byte. SIM 122 indicates an occurrence of such an error condition by pulsing-low the logic state of common line 212 to logic "0" so as to produce narrow SIM error pulses 406. Each of the SIM error pulses 406 associated with error window 404 are substantially shorter in time than each of the data bits D0–D8.

Timing diagram (b) is an example time-line 408 indicating when UART receiver 336 samples common data line 212 while the UART receiver is in the sample mode. Each of sample strobes 410 and 412 indicate a sampling occurance resulting in a sample byte being collected by UART receiver 336. While in the sample mode, UART receiver 334 can detect the occurance of narrow SIM error pulses 406 because of the relatively high sample rate associated with sample strobes 412. In this way, modem controller 302 can detect one or more bit errors, parity errors, and fault conditions from SIM 122.

Timing diagram (c) is an example UART interrupt time line 416 corresponding to when UART transmitter 334 transmits serialized data byte 402. After transmitting data byte 402, UART transmitter 334 asserts an interrupt 418 (corresponding to interrupt signal 306) to modem controller 302.

Timing diagram (d) is an example time line representing consecutive serialized data bytes 422a and 422b transmitted by UART transmitter 334 (or SIM I/O port 206). Modem controller 302 imposes a predetermined guardtime 424 between the data bytes 422a and 422b. According to the GSM 11.11 standard for example, guardtime 424 can be greater than a maximum number of predetermined stop bits associated with each of the data bytes 422a and 422b. Therefore, such guardtimes can be imposed by modem controller 302 using interval timer 318.

Timing diagram (e) is an example of UART clock 344.

Timing diagram (f) is an example of the SIM clock (SIM_CLK) depicted in relation to UART clock 344. Modem controller 302 can control the SIM clock independently and asynchronously with respect to UART clock 344. For example, as depicted in waveform plot (f), SIM_CLK includes an initial full clock cycle 430, a beginning portion of a second clock cycle 432, a middle logic low portion 434 corresponding to when SIM_CLK has been disabled by modem controller 302, and a subsequent clock cycle 436 corresponding to when modem controller 302 has re-enabled SIM_CLK.

Because the SIM clock can be disabled while the UART is operating to sample common line 212, modem controller 302 can detect improper bus states of common line 212. Such improper states include common line 212 being "stuck" high or low because SIM 122 is operating improperly, or because the SIM has been removed from, or recently installed in, WCD 104.

Timing diagram (g) is an example of the SIM reset signal SIM_RST. In an exemplary SIM reset/initialization sequence according to GSM 11.11, modem controller 302 disables SIM_CLK, transitions SIM_RST from a logic high, to a logic low, and then back to logic high, and then enables SIM_CLK. Modem controller 302 uses interval timer 320 to time such asynchronous sequencing of the aforementioned clocks and signals.

Methods

Sending a Byte

Figure 5:
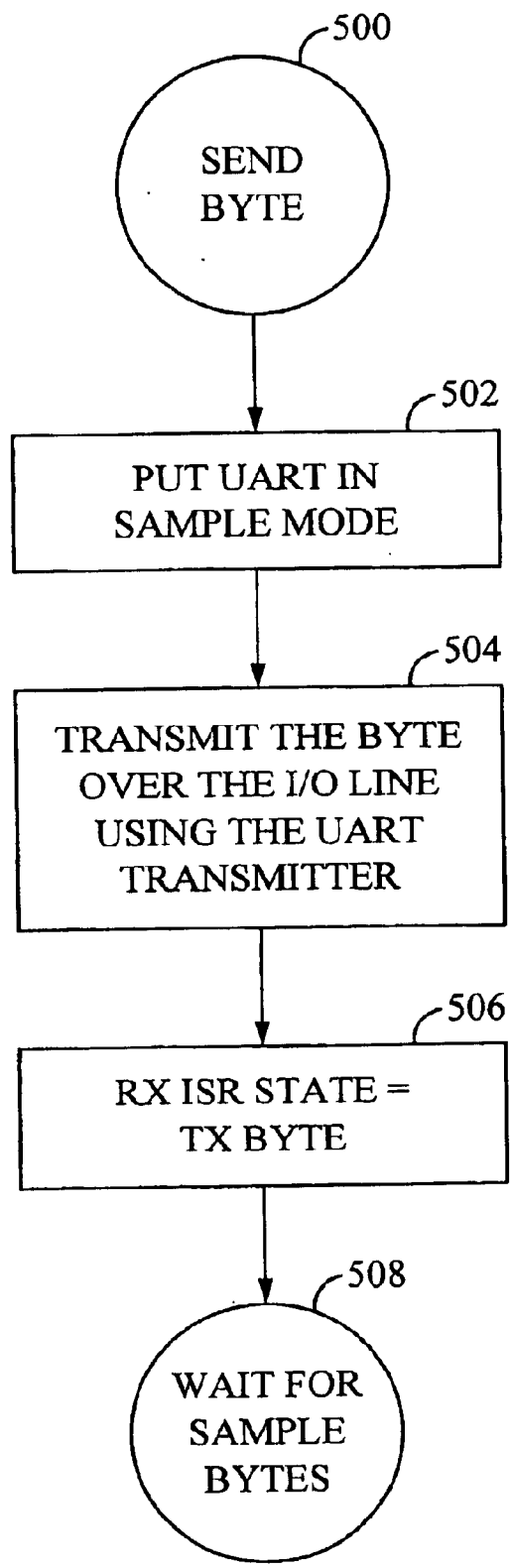
FIG. 5 is a flow chart of an example method associated with sending a data byte from a modem to a SIM of FIG. 1, according to an embodiment of the present invention.

FIG. 5 is a flow chart of an example control method 500 (labeled "Send Byte" in FIG. 5) associated with sending (that is, transmitting) a data byte from modem 102 to SIM I/O port 206, according to the present invention. At an initial step 502, modem controller 302 commands UART receiver 336 to the sample mode.

At a next step 504, modem controller 302 transmits a data byte to UART transmitter 334 and commands the UART to transmit the data byte. In response, UART transmitter 334 transmits the data byte as serialized data bits to SIM I/O port 206, over common line 212, while UART receiver 336 repetitively samples the common line 212.

After UART transmitter 334 transmits the data byte, and UART receiver 336 receives the same data byte in the wrap-around fashion described above, the UART receiver provides a receive interrupt (306) to modem controller 302 indicating receipt of the data byte. The receive interrupt is associated with a receive interrupt state or value, such as interrupt state="Tx byte" (for "Transmit byte"), or interrupt state="Process guardtime," for example. In this case, the receive interrupt state="Tx byte" because it is known that UART transmitter 334 has transmitted a data byte.

The receive interrupt initiates a next step 506. At step 506, modem controller 302 services the receive interrupt using a receive Interrupt Service Routine (mnemonically referred to as an "Rx ISR"). The Rx ISR invokes particular processing or method steps depending on the state associated with the receive interrupt. In this case, the Rx ISR invokes method steps according to the Rx ISR state="Tx byte." A detailed method corresponding to Rx ISR is described below.

At a next step 508, modem controller 302 awaits further sample bytes from UART receiver 334.

Interrupt Service Routine

Figure 6:
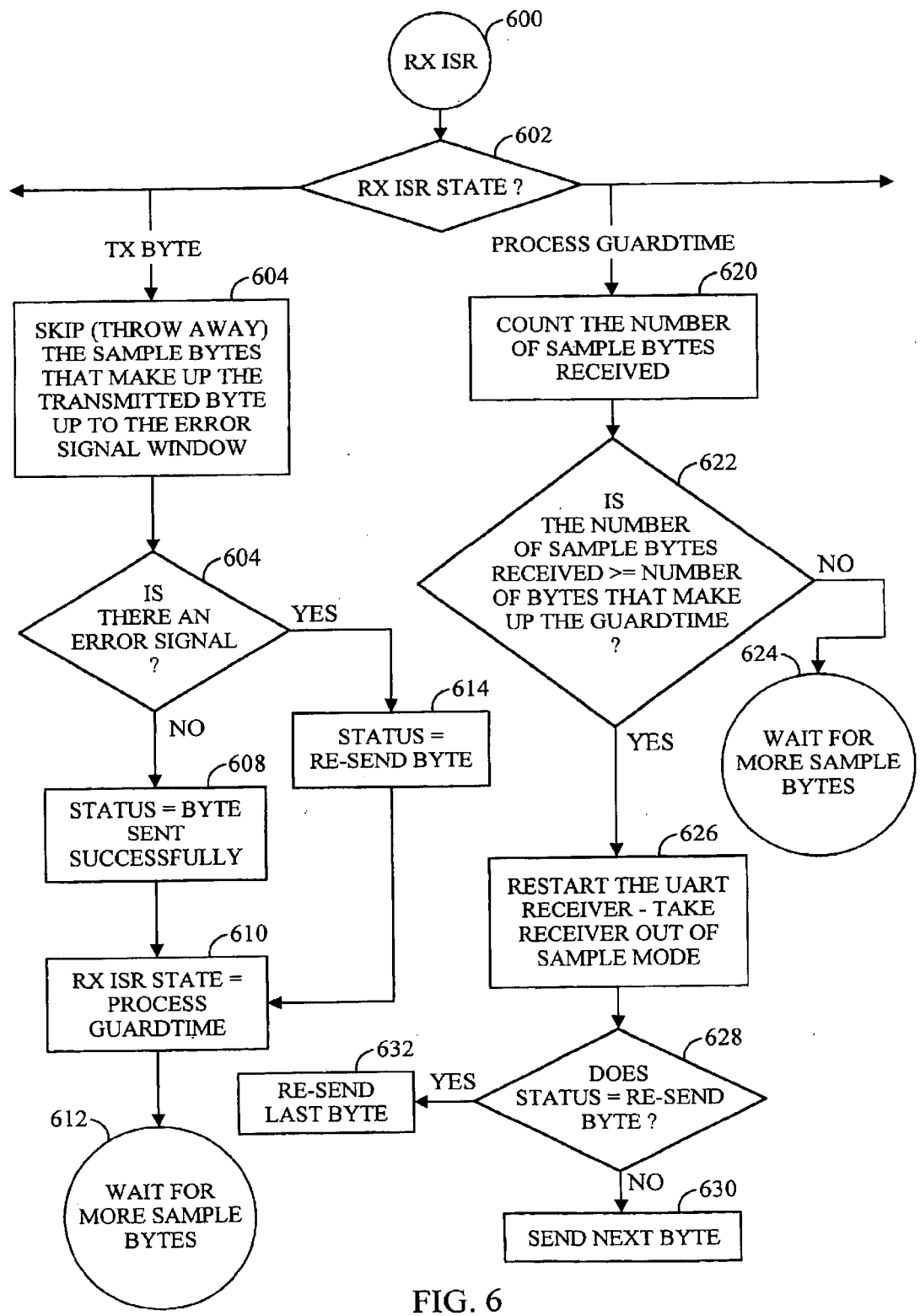
FIG. 6 is a flow chart of an example method corresponding to a Receive Interrupt Service Routine, according to an embodiment of the present invention.

FIG. 6 is a flow chart of an example method 600 corresponding to the Rx ISR, mentioned above. Method 600 is labeled "Rx ISR" in FIG. 6, and can be implemented on modem controller 302. Method 600 (that is, the Rx ISR) is initiated by a receive interrupt from UART 312.

At an initial decision step 602, it is determined whether
  Rx ISR state="Tx byte" (as mentioned above in connection with method 500), or
  Rx ISR state="Process guardtime."

When Rx ISR state="Tx byte" (as in step 506 discussed above), flow control proceeds to a next step 604. At step 604, all of the sample bytes collected by UART receiver 334 while a data byte was being transmitted (for example, during step 504, discussed above) are skipped, leaving only the sample bytes collected during the SIM error signal window (for example, error signal window 404, discussed in connection with timing diagram (a) of FIG. 4).

At a next decision step 606, the sample bytes collected during the error signal window are examined to determine whether an error signal is indicated. When no error signal is indicated at step 606, flow control proceeds to a next step 608. At step 608, a status signal is set to indicate the data byte (mentioned at steps 504 and 604 above) was sent successfully.

At a next step 610, the Rx ISR state is set to "Process guardtime."

At a next step 612, the process awaits further sample bytes.

Method steps 604–614 are invoked at step 506 described above in connection with method 500.

On the other hand, when an error signal is indicated at step 606, flow proceeds to a next 614. At step 614, the status signal is set to "re-send," thereby indicating that the data byte needs to be re-transmitted. Flow then proceeds to step 610.

Returning to initial decision step 602, when Rx ISR state="Process guardtime," flow proceeds to a next step 620. At step 620, the number of sample bytes received (collected) are counted.

At a next decision step 622, it is determined whether the number of sample bytes received is greater than or equal to the number of sample bytes corresponding to a guardtime.

When an insufficient number of sample bytes have been collected, flow proceeds to a next step 624, where more sample bytes are received.

When a sufficient number of bytes have been collected, flow proceeds to a next step 626. At step 626, UART 312 is reset, and UART receiver 336 is taken out of the sample mode.

At a next decision step 628, the status signal is examined to determined whether the status signal="re-send byte." When the status signal does not equal "re-send byte," flow proceeds to a next step 630. At step 630, a next data byte can be transmitted using method 500, for example.

On the other hand, when the status signal="re-send byte," flow proceeds to a next step 632. At step 632, the last data byte transmitted is re-transmitted using method 500, for example.

Computer System

The methods of the present invention are implemented using a controller (for example, modem controller 302) operating in the context of a computer based system. Although communication-specific hardware can be used to implement the present invention, the following description of a general purpose computer system is provided for completeness. The present invention is preferably implemented in a combination of software executed by modem controller 302, for example, and interface circuitry. Consequently, the invention may be implemented in a computer system or other processing system.

Figure 7:
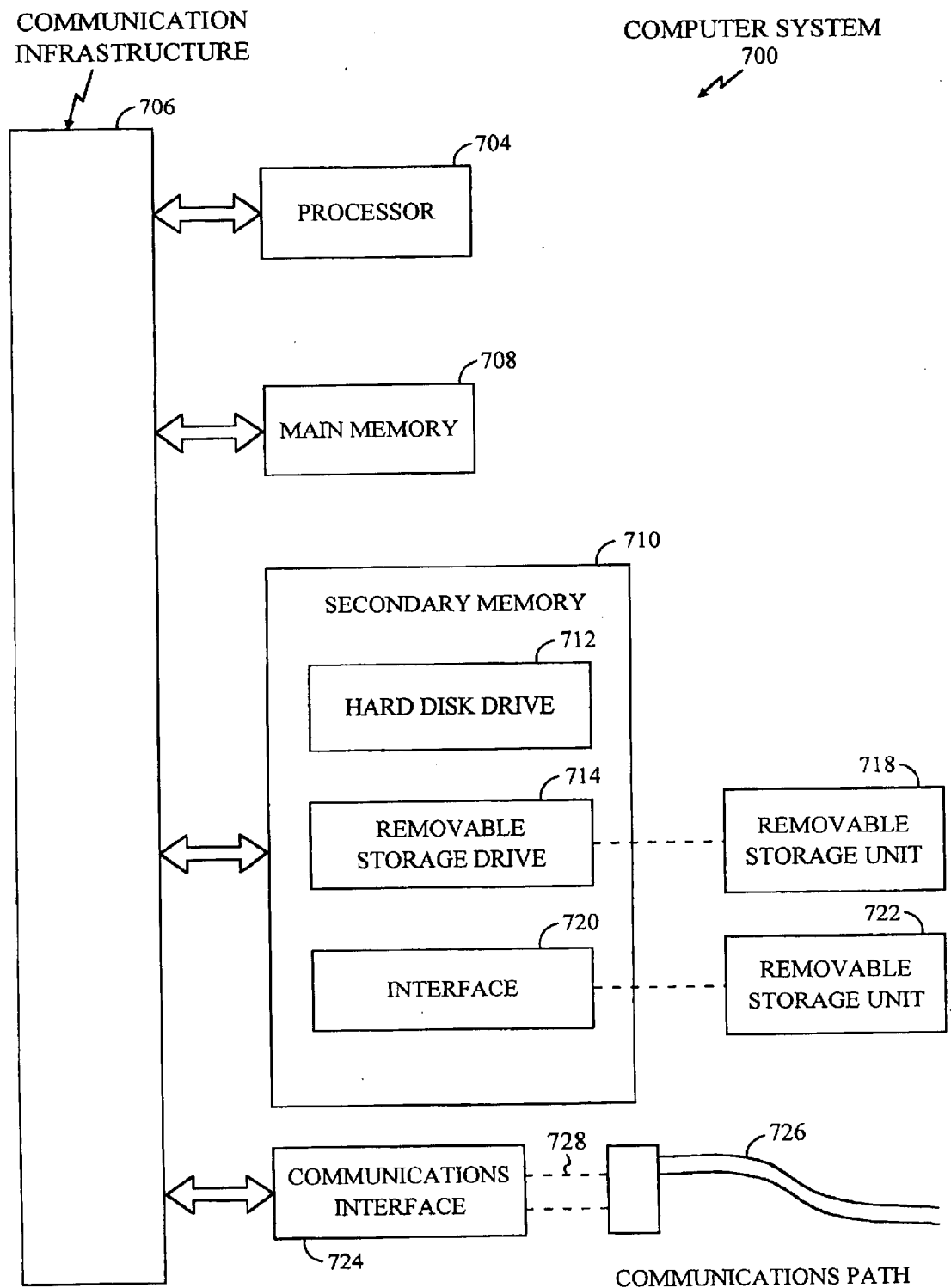
FIG. 7 is a block diagram of an exemplary computer system on which portions of the present invention can be implemented.

An example of such a computer system 700 is shown in FIG. 7. In the present invention, the above described methods or processes, for example, methods 500 and 600, execute on computer system 700. The computer system 700 includes one or more processors, such as processor 704 (corresponding to modem controller 302, for example). The processor 704 is connected to a communication infrastructure 706 (for example, a bus or network, which can include data bus 304 discussed in connection with FIG. 3). Various software implementations are described in terms of this exemplary computer system. After reading this description, it will become apparent to a person skilled in the relevant art how to implement the invention using other computer systems and/or computer architectures.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCM-CIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path 726. Communications path 726 carries signals 728 and may be implemented using wire or cable, fiber optics, a phone line, a cellular phone link, an RF link and other communications channels.

In this document, the terms "computer program medium" and "computer usable medium" are used to generally refer to media such as removable storage drive 714, a hard disk installed in hard disk drive 712, and signals 728. These computer program products are means for providing software to computer system 700.

Computer programs (also called computer control logic) are stored in main memory 708 and/or secondary memory 710. Computer programs may also be received via communications interface 724. Such computer programs, when executed, enable the computer system 700 to implement the present invention as discussed herein. In particular, the computer programs, when executed, enable the processor 704 to implement the process of the present invention. Accordingly, such computer programs represent controllers of the computer system 700. By way of example, in a preferred embodiment of the invention, the processes performed by modem controller 302 can be performed by computer control logic. Where the invention is implemented using software, the software may be stored in a computer program product and loaded into computer system 700 using removable storage drive 714, hard drive 712 or communications interface 724.

Conclusion

While various embodiment of the present invention have been described above, it should be understood that they have been presented by way of example only, and not limitation. Thus, the breadth and scope of the present invention should not be limited by any of the above-described exemplary embodiments and arrangements, but should be defined only in accordance with the following claims and their equivalents.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the abovedescribed exemplary embodiments, but should be defined only in accordance with the following claims and their equivalents.

What is claimed is:

1. A circuit for interfacing a modem in a Wireless Communication Device (WCD) to a Subscriber Interface Module (SIM), the SIM including an Input/Output (I/O) port for transmitting and receiving serial data, and a clock input for receiving a SIM clock, comprising:

a modem controller;

a Universal Asynchronous Receiver/Transmitter (UART) connected to the modem controller, the UART including a transmitter and a receiver to respectively transmit data to and receive data from the SIM I/O port over a common data line; and a programmable clock circuit adapted to generate the SIM clock and the UART clock based on a common clock provided to the programmable clock circuit, the programmable clock circuit being adapted to generate the SIM clock and the UART clock independently of one another in response to a clock control signal from the modem controller.

2. The circuit of claim 1, wherein the modem controller, the UART, and the programmable clock circuit are each constructed on the same integrated circuit (IC) chip.

3. The circuit of claim 1, wherein the programmable clock circuit is adapted to selectively enable and disable the SIM clock independently of the UART clock in response to a SIM clock enable/disable control signal.

4. The circuit of claim 1, wherein the programmable clock circuit includes:

a first programmable divider to generate the SIM clock based on the common clock and in accordance with a first frequency control signal from the modem controller; and a second programmable divider to generate the UART clock based on the common clock and in a accordance with a second frequency control signal from the modem controller.

5. The circuit of claim 1, wherein one of the SIM I/O port and the UART transmitter is adapted to transmit a serialized data byte to the UART receiver over the common data line, the modem controller being adapted to configure the UART to operate in a byte mode wherein the UART receiver collects the serialized data byte, the modem controller being adapted to read the data byte from the UART.

6. The circuit of claim 1, wherein one of the SIM I/O port and the UART transmitter is adapted to transmit serial data bits to the UART receiver over the common data line at a predetermined baud rate, the modem controller being adapted to configure the UART to operate in a sample mode wherein the UART receiver repetitively samples a signal state of the common data line at a sample rate that is a multiple of the predetermined baud rate so as to collect sample data bytes, the modem controller being adapted to read the sample data bytes and to detect error conditions related to the SIM based on the sample data bytes collected by the UART receiver.

7. The circuit of claim 1, wherein the SIM includes a reset input for receiving a SIM reset signal, the circuit further comprising a reset circuit adapted to derive and selectively assert and de-assert the SIM reset signal in response to a SIM reset control signal from the modem controller.

8. The circuit of claim 1, wherein the SIM I/O port is configured as an open-drain I/O port and the common data line is connected between the SIM I/O port and the UART receiver, the circuit further comprising:

a Bus Interface (I/F) circuit having an input coupled to the UART transmitter and an output coupled to the common data line, the Bus I/F circuit being adapted to present a high-impedance to the common data line when the UART transmitter applies a first logic level to the input of the Bus I/F circuit, and a low impedance to the common data line when the UART transmitter applies a second logic level to the input of the Bus I/F circuit.

9. The circuit of claim 8, further comprising:

a power switch connected between a power supply rail of the WCD used to supply power to the Bus I/F circuit and a power input of the Bus I/F circuit, the power switch being adapted to selectively connect and disconnect the WCD power supply rail to the power input of the Bus I/F circuit in response to a switch control signal; and a switch control circuit adapted to derive the switch control signal in response to a control signal from the modem controller, whereby the modem controller can selectively apply power to and remove power from the Bus I./F circuit.

10. The circuit of claim 9, further comprising:

a second power switch connected between a power supply rail of the WCD used to supply power to the SIM and a power input of the SIM, the second power switch being adapted to selectively connect and disconnect the WCD power supply rail to the SIM power input in response to a second switch control signal; and a second switch control circuit adapted to derive the second switch control signal in response to a second control signal from the modem controller, whereby the modem controller can selectively apply power to and remove power from the SIM.

11. The circuit of claim 1, further comprising:

a power switch connected between a power supply rail of the WCD used to supply power to the SIM and a power input of the SIM, the power switch being adapted to selectively connect and disconnect the WCD power supply rail to the SIM power input in response to a switch control signal; and a switch control circuit adapted to derive the switch control signal in response to a control signal from the modem controller, whereby the modem controller can selectively apply power to and remove power from the SIM.

12. The circuit of claim 1, further comprising an interval timer adapted to generate an interrupt to the modem controller after a programmable delay time based on a clock received by the interval timer and in accordance with a delay control signal from the modem controller.

13. A circuit on an Integrated Circuit (IC) chip for interfacing a modem in a Wireless Communication Device (WCD) to a Subscriber Interface Module (SIM), the SIM including an Input/Output (I/O) port for transmitting and receiving serial data, a clock input for receiving a SIM clock, and a reset input for receiving a SIM reset signal, comprising:

a modem controller;

a Universal Asynchronous Receiver/Transmitter (UART) connected to the modem controller, the UART including a transmitter and a receiver to respectively transmit data to and receive data from the SIM I/O port over a common data line; and a programmable clock circuit adapted to generate the SIM clock and the UART clock based on a common clock provided to the programmable clock circuit, the programmable clock circuit being adapted to generate the SIM clock and the UART clock independently of one another in response to a clock control signal from the modem controller; and a reset circuit adapted to derive and selectively assert and de-assert the SIM reset signal in response to a SIM reset control signal from the modem controller.

14. A circuit for interfacing a modem in a Wireless Communication Device (WCD) to a Subscriber Interface Module (SIM), the SIM including an Input/Output (I/O) port for transmitting and receiving serial data, the SIM I/O port having an open-drain configuration, comprising:

a modem controller;

a Universal Asynchronous Receiver/Transmitter (UART) connected to the modem controller, the UART including a transmitter and a receiver to respectively transmit data to and receive data from the SIM I/O port over a common data line;

a Bus Interface (I/F) circuit having an input coupled to the UART transmitter and an output coupled to the common data line, the Bus I/F circuit being adapted to convert the UART transmitter to an open-drain configuration compatible with the SIM I/O port;

a switch connected between a power supply rail of the WCD and a power supply input of the Bus I/F circuit, the switch being adapted to selectively connect and disconnect the WCD power supply rail to the power input of the Bus I/F circuit in response to a switch control signal; and a switch control circuit adapted to derive the switch control signal in response to a control signal from the modem controller, whereby the modem controller can selectively apply power to and remove power from the Bus I/F circuit.

15. The circuit of claim 14, further comprising:

a second switch connected between a power supply rail of the WCD used to supply power to the SIM and a power input of the SIM, the second switch being adapted to selectively connect and disconnect the WCD power supply rail to the SIM power input in response to a second switch control signal; and a second switch control circuit adapted to derive the second switch control signal in response to a second control signal from the modem controller, whereby the modem controller can selectively apply power to and remove power from the SIM.

16. A method of interfacing a modem in a Wireless Communication Device (WCD) to a Subscriber Interface Module (SIM), the modem including a modem controller coupled to a Universal Asynchronous Receiver/Transmitter (UART), the UART including a transmitter and a receiver to respectively transmit serial data to and receive serial data from the SIM over a common data line at one or more predetermined baud rates, the UART receiver being configurable to operate in either of a byte mode wherein the UART receiver collects serialized data bytes transmitted thereto at a predetermined baud rate and a sample mode wherein the UART receiver samples a state of the common data line at a sample rate exceeding the predetermined baud rate, comprising the steps of:

(a) configuring the UART to operate in the sample mode;

(b) transmitting a byte to the SIM over the common line using the UART transmitter;

(c) repetitively sampling a state of the common line during an error signal window occurring after the byte has been transmitted in step (b), thereby collecting sample bytes indicative of whether an error related to the SIM has occurred;

(d) determining whether the error related to the SIM has occurred based on the sample bytes; and (e) re-transmitting the byte to the SIM when it is determined that the error related to the SIM has occurred.

17. The method of claim 16, further comprising the steps of:

(f) determining when a predetermined guardtime has elapsed since the byte was transmitted at step (b) by counting further sample bytes; and (g) repeating step (b) when the predetermined guardtime has elapsed.

* * * * *